May 12, 1959   T. J. BUTLER   2,886,497
METHOD FOR DETERMINING THE PERMEABILITY OF STEEL TO HYDROGEN
Filed April 12, 1957
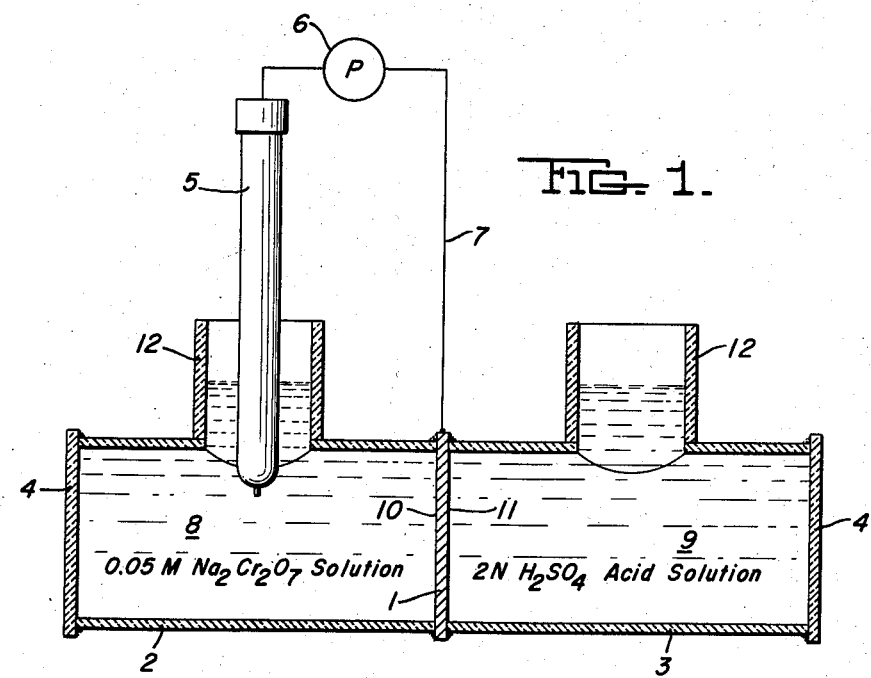
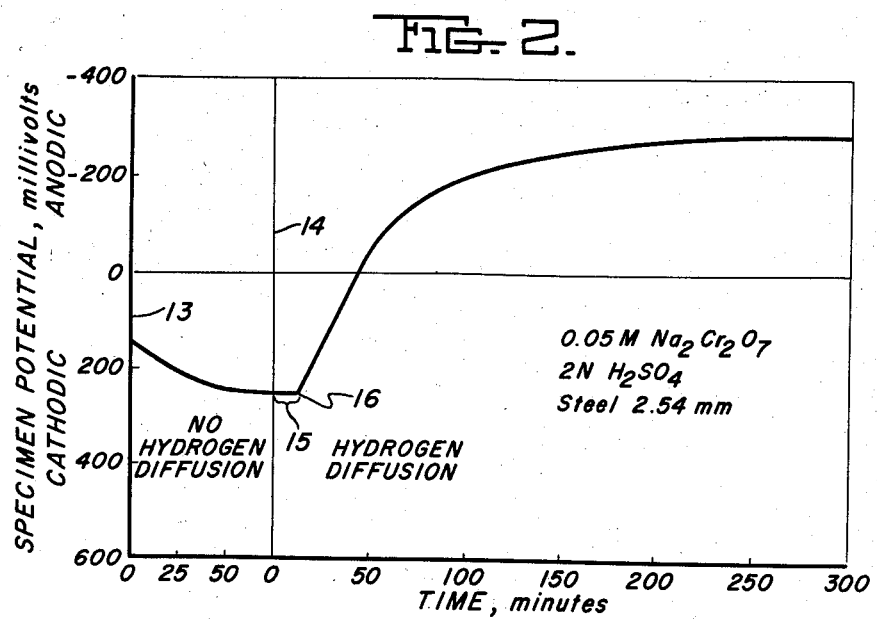
INVENTOR
THOMAS J. BUTLER
By: Donald G. Dalton
his Attorney.

2,886,497
METHOD FOR DETERMINING THE PERMEABILITY OF STEEL TO HYDROGEN

Thomas J. Butler, Monroeville, Pa., assignor to United States Steel Corporation, a corporation of New Jersey Application April 12, 1957, Serial No. 652,595

5 Claims. (Cl. 204—1)

This invention is directed generally to the problem of determining the quality of different steels for specialized uses such as tinning and enameling operations. More particularly it is concerned with certain hydrogen characteristics of steel, which include its permeability to hydrogen and the solubility of hydrogen therein, and with obtaining an indication based on such characteristics of the relative abilities of different steels, for example, to withstand corrosion. As indicated, it relates to a method and apparatus for determining the permeability of steel to hydrogen.

The susceptibility of steel to permeation by hydrogen and to hydrogen entering into solution therein has been found to have a direct bearing on its suitability for different uses. For example, steel highly permeable to hydrogen is unsuitable for equipment in which hydrogen embrittlement cannot be tolerated and for applications where it is to be provided with an enamel coating. In addition, the more highly permeable steels can be expected to corrode faster than steels which are less permeable to hydrogen. In the case of black-plate used in the production of tinplate, these hydrogen characteristics afford an indication as to whether the black-plate is of good or poor quality. It will thus be apparent that information concerning these hydrogen characteristics is highly desirable from the standpoint of quality control in some finished steel products.

It is of course to be understood that the above mentioned hydrogen characteristics of steel are those which result from atomic hydrogen as distinguished from molecular hydrogen which will not permeate steel to any appreciable extent. In this respect, it is generally recognized that steel is permeable to hydrogen under conditions favorable to the formation of atomic hydrogen, i.e., high temperature, acid corrosion, or cathodic charging. When all surfaces of a steel specimen are exposed to atomic hydrogen, the metal eventually becomes saturated with hydrogen. When only one surface is exposed, atomic hydrogen will diffuse through the specimen and be liberated at the unexposed surfaces. To determine the quantity of hydrogen dissolved in steel specimens, vacuum fusion and degassing techniques have been proposed and developed by various workers and have been used as a basis for gas-solubility or gas-diffusion measurements in determining the permeability of steel to hydrogen. Most of such techniques are relatively complicated and require expensive and highly sensitive apparatus which usually includes at least a high vacuum system and very sensitive vacuum gauges. In addition, several hours are required according to such techniques to collect the first measurable quantity of hydrogen from a specimen and as much as several days may be required to complete the examination of a single specimen. The expense and time required obviously renders such techniques impractical for purposes other than laboratory experiments.

The invention, accordingly, has as one of its principal objects the provision of a method and apparatus which will reduce to a period of a few minutes the time required for determining the hydrogen characteristics of steel specimens, and according to which the determination of such characteristics may be effected by relatively simple and inexpensive testing and measuring equipment.

Another and more specific object of the invention is to provide a method and apparatus for determining the relative permeability of steel to hydrogen.

A still further object is to provide a method and apparatus for examining the relative electrode potential of a steel specimen electrochemically and, from change in such potential in response to exposure of the specimen to atomic hydrogen, determining its permeability to hydrogen.

Generally stated, the above and related objects of this invention are effected by an electrochemical procedure which involves first subjecting one side of a metal specimen to the oxidizing action of a dilute passivating solution of, for example, sodium dichromate, and, thereafter, applying atomic hydrogen to an opposite side of the specimen. According to a preferred practice of the invention, the atomic hydrogen is generated and applied to the specimen by subjecting it to the corrosive action of an acid bath of, for example, dilute sulphuric acid. Prior to applying the acid bath to the specimen, a standard reference electrode is immersed in the passivating solution and is connected in series with the specimen through a recording potentiometer to obtain a reading of the relative potential of the specimen and, after such potential stabilizes at a substantially constant value, the acid bath is applied. The application of the acid bath to the other side of the specimen, after a period of time, produces a change in the potential of the one side exposed to the passivating solution which takes place abruptly and rapidly in an anodic direction toward the hydrogen over-voltage value of the specimen. The length of the period of time required for this change in potential to take place furnishes, in a manner to be described, an indication of the relative hydrogen permeability of the steel specimen undergoing examination. It further furnishes an indication of the relative hydrogen solubility of the specimen and its relative rate of corrosion.

Other objects and advantages of the invention will become apparent from the following description.

In the drawings: Figure 1 is a diagrammatic sectional view of an apparatus constructed in accordance with the principles of this invention; and Figure 2 is a graph showing the manner in which the specimen electrode potential changes with respect to time according to a preferred practice of the invention.

As shown in Figure 1 of the drawings, an apparatus constructed in accordance with the principles of this invention includes a specimen to be examined in the form of a steel plate 1, a pair of open ended glass tubes 2 and 3, glass closure plates 4 for the remote ends of the tubes 2 and 3, a standard reference electrode 5, a recording potentiometer 6, and a circuit 7 connecting the specimen 1 and reference electrode 5 in series through the potentiometer 6. The apparatus is assembled by securing adjacent ends of the tubes 2 and 3 to opposite sides of the specimen 1 with a liquid sealing compound, a mixture of beeswax and rosin being satisfactory for this purpose. The tubes 2 and 3 are arranged in positions aligned axially with respect to each other and in such manner that the plate 1 forms a common closure for their adjacent ends. The plates 4 are similarly secured to the opposite or remote ends of the tubes 2 and 3 and respectively provide closures therefor. In this manner, the parts 1, 2, 3 and 4 define a pair of isolated cells or compartments 8 and 9 which are fluid-tight containers for a purpose to be described.

Each of the tubes 2 and 3 has an upwardly extending neck 12 providing an opening through which liquid may be poured into one of the compartments 8 or 9. The reference electrode 5 is provided with an insulating support (not shown) on the neck 12 of the tube 2 mounting it in a position with its lower end extending into the compartment 8. The terminal of the electrode 5 is connected by the circuit 7 in series with the recording potentiometer 6 and the specimen 1. The electrode 5 and potentiometer 6, being conventional, have been shown diagrammatically in the drawings. In an apparatus used to obtain the data for Figure 2, the electrode 5 was a Leeds-Northrup Model 1199–31 saturated calomel electrode and the potentiometer 6 was a Leeds-Northrup Micromax recorder which was operated to record the potential of the specimen 1 at one minute intervals.

According to a preferred practice of the method of this invention and the one used in gathering the data for the preparation of Figure 2, the cell or container 8 was first filled with a 0.05 mollar solution of sodium dichromate and, after a period of time sufficient for the potential of the specimen 1 to arrive at a stabilized value, the cell or container 9 was filled with a two normal solution of sulphuric acid. The graph of Figure 2 shows the change in potential of the surface 10 of the specimen 1, which is in the form of a steel plate having a thickness of 2.54 millimeters, with respect to time before and after the addition of the acid. In this showing, the vertical line 13 designates the time of addition of the passivating solution of sodium dichromate to the cell 8. The addition of the passivating solution to the cell 8 placed the potential of the surface 10 at a cathodic value relative to the standard reference electrode 5 which gradually increased until it reached a stabilized value slightly greater than 200 millivolts. At the time designated by the vertical line 14, the acid solution was added to the cell or container 9. Thereafter, the surface 10 potential remained constant for a short interval of time, designated by the numeral 15. At the end point 16 of this interval, the surface 10 potential changed abruptly in an anodic direction relative to the reference electrode 5. In a manner to be described, the length of the time interval 15 furnishes an indication of the relative permeability of the steel specimen 1 to hydrogen.

The abrupt change of specimen potential at the point 16 is in the nature of a phenomenon, which is believed due to the reducing action of atomic hydrogen generated at the surface 11 on the passive film of iron oxide at the surface 10. The passivating action of sodium dichromate solution in the cell 8 forms a passive film of iron oxide on the specimen surface 10, and produces the stabilized cathodic potential referred to above. The subsequent addition of the sulphuric acid solution to the cell 9 subjects the surface 11 to a corrosive action which liberates atomic hydrogen at the surface 11. Since it is recognized that steel is permeable to atomic hydrogen, the hydrogen generated at the surface 11 permeates through the specimen 1 to the surface 10. Atomic hydrogen is known to be highly effective as a reducing agent and the hydrogen permeating through the specimen 1 will reduce the passive film of iron oxide at the surface 10. The abrupt change in potential at the point 16 can be accounted for only by a reduction of the iron oxide film at the surface 10 in this manner. There is of course no change in specimen potential until the hydrogen permeates to the surface 10 and the time required for this to take place after the addition of acid provides an indication of the relative permeability of the specimen to hydrogen.

Subsequent investigations showed that the length of the time interval 15 increased with the thickness of the specimen under examination. Calculations based on such investigations developed that the increase in time was substantially proportional to the square of the specimen thickness. The findings of the invention in this respect accord with previous theory regarding the diffusion of hydrogen in steel.

Change in acid concentration of the bath added to the cell 9 was found to change the shape of the time potential curve. Generally stated, stronger acid concentrations had the effect of decreasing the time interval 15 and produced an increase in the rate of potential change subsequent to the point 16. The stronger acid concentrations of course increase the rate of corrosion and thereby the generation of atomic hydrogen. The addition of sodium sulphite to the sulphuric acid bath added to the cell 9 was found to accelerate the rate of specimen potential change and to shorten the time interval 15 required for such change to start. The sulphite ion either accelerates the rate of acid corrosion or changes the ratio of diffused to effused hydrogen.

It is of course to be understood that any corrosive medium used in the cell 9 will generate atomic hydrogen. For this purpose, water or other acids may be employed. However, materials having a mild corrosive action require longer time periods 15 and, to expedite the observation, the use of sulphuric acid with sodium sulphite as an accelerator will be found desirable. Cathodic charging by the use of an electrolyte in the cell 9 with a charging electrode imersed therein has also been found effective.

The potential at which the specimen surface 10 stabilizes prior to addition of the acid bath was found to vary with the concentration of the sodium dichromate passivating bath. Concentrations of 0.01 M sodium dichromate or less were found insufficient to drive the surface 10 to a cathodic potential and resulted in a potential which was anodic relative to the electrode 5. This of course indicates the desirability of a solution having a minimum concentration of between 0.01 M and 0.05 M. Higher initial cathodic potentials are desirable for the reason that the resulting time-potential curve has a more abrupt change at the point 16 and a steeper slope in an anodic direction. Concentrations greater than 0.05 M sodium dichromate were not found to provide any noticeable advantage. Change in concentrations of the passivating solution did not vary the length of the time period 15. Although sodium dichromate was used as the passivating materials are potassium dichromate, am- above, it will be appreciated that other mediums having a similar passivating action on iron may be employed for the purposes of this invention. Examples of such other passivating materials are potassium dichromate, ammonium nitrate, potassium permanganate, mercurous nitrate, sodium hydroxide, nitric acid, and the like.

From the foregoing, it will be apparent that the method of this invention provides a convenient practice for rapidly determining the relative corrosive properties of different steels and thereby their relative suitability, for example, as black-plate for the production of tinplate. In this respect, attention is particularly directed to the fact that, if all other factors such as concentration of the passivating and acid solutions in cells 8 and 9 are maintained constant, the length of the time interval 15 required to initiate an abrupt change in the potential of the specimen under examination will be directly proportional to the hydrogen permeability of the specimen. Such time interval will thus furnish an indication of the related characteristics of corrodibility and hydrogen solubility of the specimen under observation. Attention is also directed to the fact that this information may be obtained in a matter of a few minutes compared to the longer periods of time required by previous practices.

In the apparatus shown in Figure 1 of the drawings, the glass containers 2 and 3 must be assembled relative to the specimen 1 to provide the compartment cells 8 and 9 for each test. This of course requires that the apparatus be assembled for testing and torn apart after each specimen is tested. In this respect, it is to be understood that the invention contemplates improved apparatus which does not require assembly and disassembly in this manner and which will expedite the testing of several specimens. For this purpose, there may be provided an apparatus in which the compartment cells 2 and 3 are permanently mounted in position with sealing means in which the specimen 1 may have a slide fit for insertion and removal with respect thereto. With an apparatus as shown in Figure 1, it will be apparent that preshaped specimens are not required for testing purposes and that such apparatus may be applied to finished apparatus or articles for the purpose of testing the characteristics of the steel from which it is made. As an example of this type of use, it may be applied to the inner and outer surfaces of a steel tank or liquid container wall. In such case, it is necessary for the compartment cells 2 and 3 to be secured in axially aligned positions so that the hydrogen generated in the cell 9 will diffuse through the metal being tested to the surface 10.

While one embodiment and a preferred practice of my invention have been shown and described it will be apparent that other adaptations and modifications may be made without departing from the scope of the following claims.

I claim:

1. A method of obtaining an indication of the relative permeability of a steel specimen to atomic hydrogen which comprises applying a passivating bath to one side of said specimen to form a passive film of iron oxide thereon, comparing the potential of said one side with respect to the potential of a standard reference electrode immersed in said bath, subjecting the opposite side of said specimen to the action of atomic hydrogen, and measuring the time interval required for said hydrogen to effect a change in the potential of said one side relative to said electrode.

2. The method defined in claim 1 characterized by said passivating bath being a 0.05 molar solution of sodium dichromate (0.05 M $Na_2Cr_2O_7$).

3. The method as defined in claim 1 characterized by atomic hydrogen being generated and applied to said opposite side by applying thereto a corrosive bath of a two normal solution of sulphuric acid (2 N $H_2SO_4$).

4. A method of determining the permeability of a steel specimen to hydrogen which comprises the sequential operations of first applying a passivating bath to one side of said specimen to form a passive film of iron oxide thereon, and thereafter applying a corrosive acid bath to an opposite side thereof to subject said opposite side to the action of atomic hydrogen, continuously observing the potential of said one side with respect to the potential of a standard reference electrode immersed in said passivating bath, the said acid bath being applied to said opposite side after the potential of said one side is observed to have stabilized at a constant cathodic value, and measuring the time interval between the time of application of said acid bath and the time when the potential of said one side is observed to change abruptly in an anodic direction from said cathodic value.

5. A method of determining the permeability of a steel specimen to hydrogen which comprises applying a passivating bath to one side of said specimen to form a passive film of iron oxide thereon, observing the potential of said one side with respect to the potential of a standard reference electrode immersed in said bath and noting the time at which the potential of said one side stabilizes at a constant cathodic value, thereafter applying a bath to the opposite side of said specimen that will subject it to the action of atomic hydrogen, and measuring the time interval required for said hydrogen to effect a change in the potential of said one side relative to said electrode.

References Cited in the file of this patent

UNITED STATES PATENTS

| | | |
|---|---|---|
| 1,474,151 | Keeler | Nov. 13, 1923 |
| 2,455,726 | Bendix | Dec. 7, 1948 |
| 2,531,747 | Stearn | Nov. 28, 1950 |
| 2,786,021 | Marsh | Mar. 19, 1957 |

FOREIGN PATENTS

| | | |
|---|---|---|
| 564,516 | Great Britain | Oct. 2, 1944 |

OTHER REFERENCES

Evans: Metallic Corrosion, Passivity and Protection, Edward Arnold and Co., London, 1948, pp. 216–218 and 598.

Akademiia: Nauk. Doklady, vol. 89, 1953, pp. 321–323, and vol. 92, 1953, pp. 979–982, vol. 100, 1955, pp. 319–321.

UNITED STATES PATENT OFFICE

CERTIFICATE OF CORRECTION

Patent No. 2,886,497                                                                   May 12, 1959

Thomas J. Butler

It is hereby certified that error appears in the printed specification of the above numbered patent requiring correction and that the said Letters Patent should read as corrected below.

Column 4, line 44, for "materials are potassium dichromate, am--" read -- solution in the practice of the method described --.

Signed and sealed this 1st day of September 1959.

(SEAL)
Attest:
KARL H. AXLINE                                                           ROBERT C. WATSON
Attesting Officer                                                  Commissioner of Patents